United States Patent [19]
Cotter

[11] Patent Number: 5,975,507
[45] Date of Patent: Nov. 2, 1999

[54] GAS SPRING WITH FILLER BLOCK

[75] Inventor: Patrick J. Cotter, Plymouth, Mich.

[73] Assignee: Diebolt International, Inc., Plymouth, Mich.

[21] Appl. No.: 08/910,790

[22] Filed: Aug. 13, 1997

[51] Int. Cl.⁶ .......................................................... F10F 9/34
[52] U.S. Cl. ..................................... 267/64.28; 267/64.11
[58] Field of Search .............................. 267/64.28, 64.11

[56] References Cited

U.S. PATENT DOCUMENTS

| | | | |
|---|---|---|---|
| 4,792,128 | 12/1988 | Holley | 267/118 |
| 4,813,655 | 3/1989 | Hennells | 267/64.28 |
| 4,838,527 | 6/1989 | Holley | 267/64.28 |
| 5,020,570 | 6/1991 | Cotter | 137/596.12 |
| 5,303,906 | 4/1994 | Cotter et al. | 267/64.11 |
| 5,344,125 | 9/1994 | Cotter | 267/64.28 |
| 5,386,975 | 2/1995 | Wallis | 267/64.28 |

*Primary Examiner*—Matthew C. Graham
*Attorney, Agent, or Firm*—Reising, Ethington, Barnes, Kisselle, Learman & McCulloch, P.C.

[57] ABSTRACT

A gas spring with a filler block assembly defining the rear sealing wall of the gas chamber of the gas spring. The filler block assembly has an end cap with an internally threaded through passageway for filling the chamber with compressed gas. An externally threaded screw plug is threaded into the cap passageway and has an enlarged head portion with a conical sealing surface. An O-ring encircles the screw plug and is wedge-captured sealably between its sealing surface and a radial sealing surface on the cap front face. The screw plug and passageway threads are constructed and arranged to provide a gas chamber filling leakage path therebetween such that the gas spring chamber can be charged with pressurized nitrogen gas admitted into the rear end of the cap filling passageway with the screw plug and O-ring already installed in the cap in final operable position to function as a one-way check valve for admitting the pressurized gas to the spring chamber and to prevent egress of the gas therefrom. In one embodiment, the screw plug is imperforate. In another embodiment, the screw plug has a bleed passageway extending axially therethrough communicating at one end with the gas spring chamber and at the other end with the filling passageway. A bleed plug is threadably received in the cap filling passageway, and a sealing gasket is captured between the bleed plug and the screw plug for sealing the adjacent end outlet of the screw plug bleed passageway. The gas filling leakage path then also includes the clearance space between the threads of the bleed plug and the cap filling passageway.

20 Claims, 2 Drawing Sheets

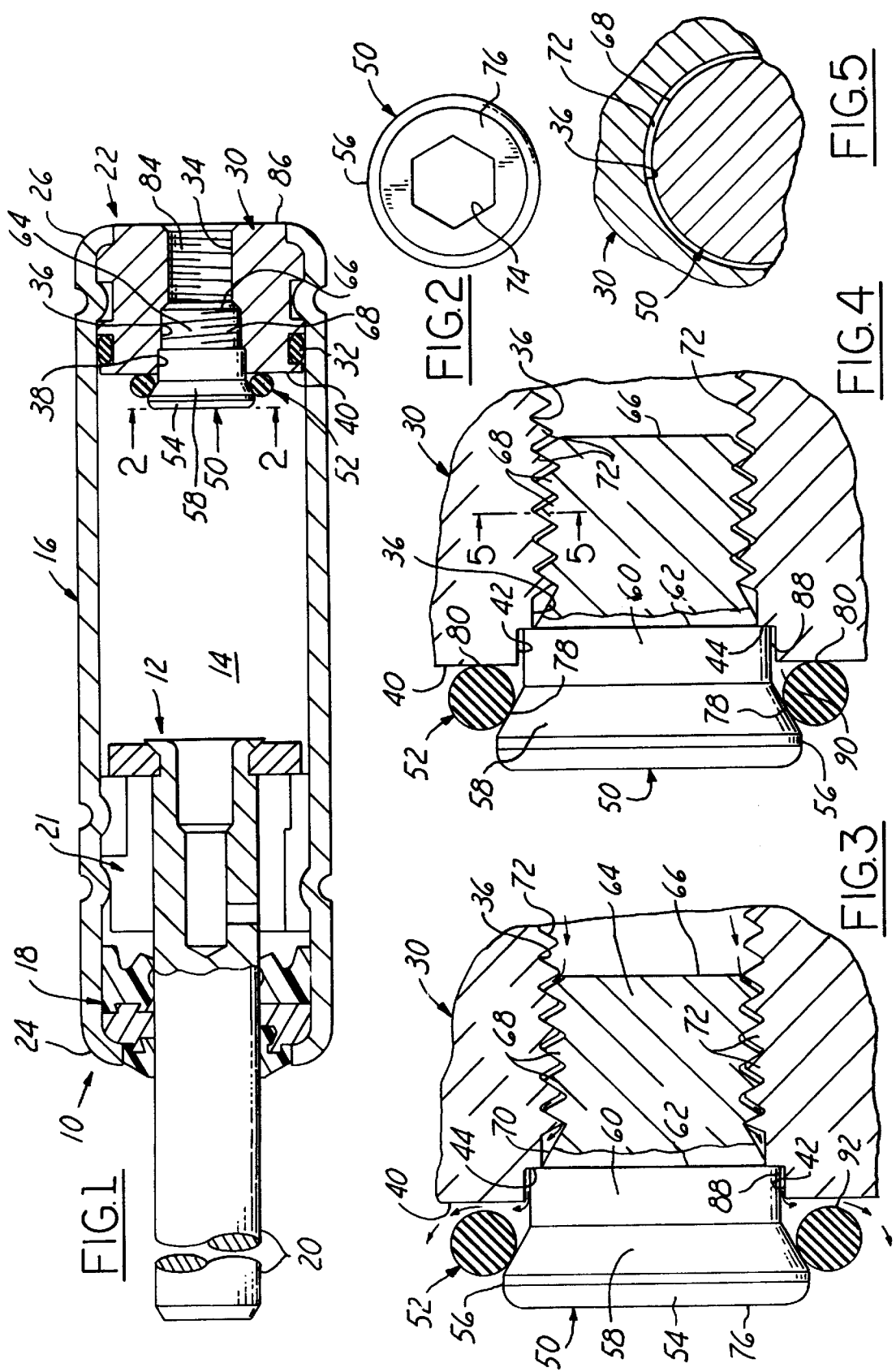

GAS SPRING WITH FILLER BLOCK

FIELD OF THE INVENTION

This invention relates to pneumatic devices, and more particularly to a gas spring which yieldably resists movement of a reciprocating element in a press mechanism or the like, such as a clamping ring of a die assembly for forming sheet metal parts.

BACKGROUND OF THE INVENTION

Previously, self-contained gas springs have been constructed with an actuating rod connected to a piston slidably received in a cylinder having a chamber which is precharged at a predetermined pressure, such as 2,000 psi, with an inert gas such as nitrogen. When the rod and piston are forced into the chamber, the gas therein is compressed to a maximum operating pressure which is usually in the range of about 3,000 to 5,000 psi, depending on the volume of the chamber and the effective area and stroke of the piston. In normal use, the pressure to which a self-contained gas spring is initially charged is not varied or changed. The spring is initially charged, relieved and recharged through a high pressure charging valve construction mounted in a filler block closing the rear end of the casing of the gas spring. In some applications the charging valve is operable to adjust the gas spring charging pressure by release of gas pressure from the spring chamber to ambient and then recharging through the valve to a new set pressure. Preferably the chamber port of the filler block is internally threaded to receive a flexible hose coupled to an external gas source, as well as for threadably mounting the gas spring on a suitable externally threaded support.

Examples of prior gas springs and systems are disclosed in U.S. Pat. Nos. 4,792,128; 4,838,527; 5,020,570 and 5,303,906 assigned to Diebolt International, Inc., the assignee of record herein, and which are incorporated herein by reference. In particular, the gas spring charging valve filler block construction disclosed and claimed in conjunction with the embodiment illustrated in FIGS. 6–8 of the '906 patent has been used successfully commercially and has proved advantageous with respect to its relative simplicity of manufacture and assembly, and because it cannot be tampered with from outside the pressure vessel. The valve has no moving metal parts and merely uses an elastomeric O-ring as a movable one way check valve member and seal.

However, the valve is designed for charging of a gas spring one time only. In addition to this limitation, in commercial manufacture and use certain problems have been discovered relative to the construction and operation of this fill valve. Although the O-ring was specified with a preferred durometer of 70, experience has shown that a 90 durometer hardness was needed in the high pressure range of operation of the gas spring to resist extrusion of the elastomeric material of the O-ring through the small diameter charging hole 122 of the central modular head 114 of the valve construction. Even increasing the durometer to 94 has been found not to prevent such O-ring failure in certain applications. Moreover, use of the harder O-ring material limits the capability of the O-ring to seal at lower pressures, e.g., 200 to 400 psi, because of its reduced capability to fill in imperfections in the O-ring sealing surfaces 116 and 118 of this valve construction.

It has also been found that in the manufacturing process of the '906 filler block it is difficult to control or monitor the surface finish for these O-ring seating surfaces 116 and 118 in the rear head 114. Also, to prevent damage to the O-ring the lateral port 122 entering at the bottom of the V-shaped recess or groove 120 should be of relatively small diameter, preferably about 0.015 inches. Accordingly, the size of the drill required for drilling this charging hole is fragile and subject to breakage, which is difficult to detect in the manufacturing process. The drilling process also requires removal of burrs after drilling. Geometrically, the localized radial entry of this small diameter lateral port 122 at the bottom of the V-shaped groove 120 relative to the overlying O-ring 124 with its 360° sealing surfaces 116 and 118 inherently contributes to unequal pressure distribution and hence sealing forces which can contribute to leakage problems.

OBJECTS OF THE INVENTION

Accordingly, among the objects, features and advantages of this invention are to provide an improved gas spring charging valve filler block construction which overcomes the aforementioned manufacturing and operational problems of the aforementioned '906 valve construction, which is easier to manufacture, requires no small hole drilling, enables the use of a lower durometer O-ring that provides improved sealing over a greater range of gas pressures, i.e., even at lower pressures ranging down to about 200 psi, is compatible with an internally threaded through-passage in the filler block provided for attachment of threaded hose nipples and/or mounting of the gas spring, renders it easier to control the extent of pre-compression of the O-ring in assembly and use, can be readily constructed to be pre-charged once and operated as a self-contained unit or for adjustment of internal gas pressure by relief to atmosphere and is rugged, durable, reliable, of simplified design and economical manufacture and assembly, and has a long service life.

SUMMARY OF THE INVENTION

In general, and by way of summary description and not by way of limitation, the invention accomplishes the aforementioned objects and provides the aforementioned advantageous features by providing an improved filler block wherein the valve head is a separate screw plug member that threadably mounts in a filler block through-passageway and has a shoulder stop seat therewith so as to capture an O-ring, preferably of only 70 durometer, between the frusto-conical seating surface on the valve head and the radial surface on the filler block with a predetermined pre-compression. A gas pressure charging passageway is provided by the clearance between the mating external threads of the screw plug and the internal threads of the block through-passageway. Hence the interior outlet of this passageway has a 360° annular geometry leading axially to the 360° annular space encircled by the O-ring to better equalize sealing forces as it bears on the aforementioned plug and filler block seating surfaces. For one time charging the valve head screw plug may be imperforate, whereas for relief of gas spring pressure to atmosphere the screw plug may have an axial through-passageway sealed by a flat gasket seal held against the plug through-passage outlet end by an auxiliary hex socket bleed plug threaded into the filler block through-passageway to releasably clamp the gasket seal against the rear end face of the valve head screw plug. The gas pressure charging passageway then includes the clearance between the engaged threads of the bleed plug and block passageway.

BRIEF DESCRIPTION OF THE DRAWINGS

The foregoing as well as other objects, features and advantages of the invention will become apparent from the following detailed description of the preferred embodiments and best mode, appended claims and accompanying drawings (which are to engineering scale unless otherwise indicated) in which:

FIG. 1 is a part axial center sectional and part fragmentary elevational view of a gas spring incorporating a first embodiment of a filler block construction of the present invention;

FIG. 2 is a end elevational view of the screw plug valve head taken on the line 2—2 of FIG. 1 and shown by itself;

FIG. 3 is an enlarged fragmentary view of the filler block charging valve construction of FIG. 1 shown in a gas spring chamber charging mode of operation;

FIG. 4 is a view similar to FIG. 3 showing the charging valve construction in sealed condition;

FIG. 5 is a fragmentary cross sectional view taken on the line 5—5 of FIG. 4.

DETAILED DESCRIPTION OF THE PREFERRED EMBODIMENT

First Embodiment

Figure 6:
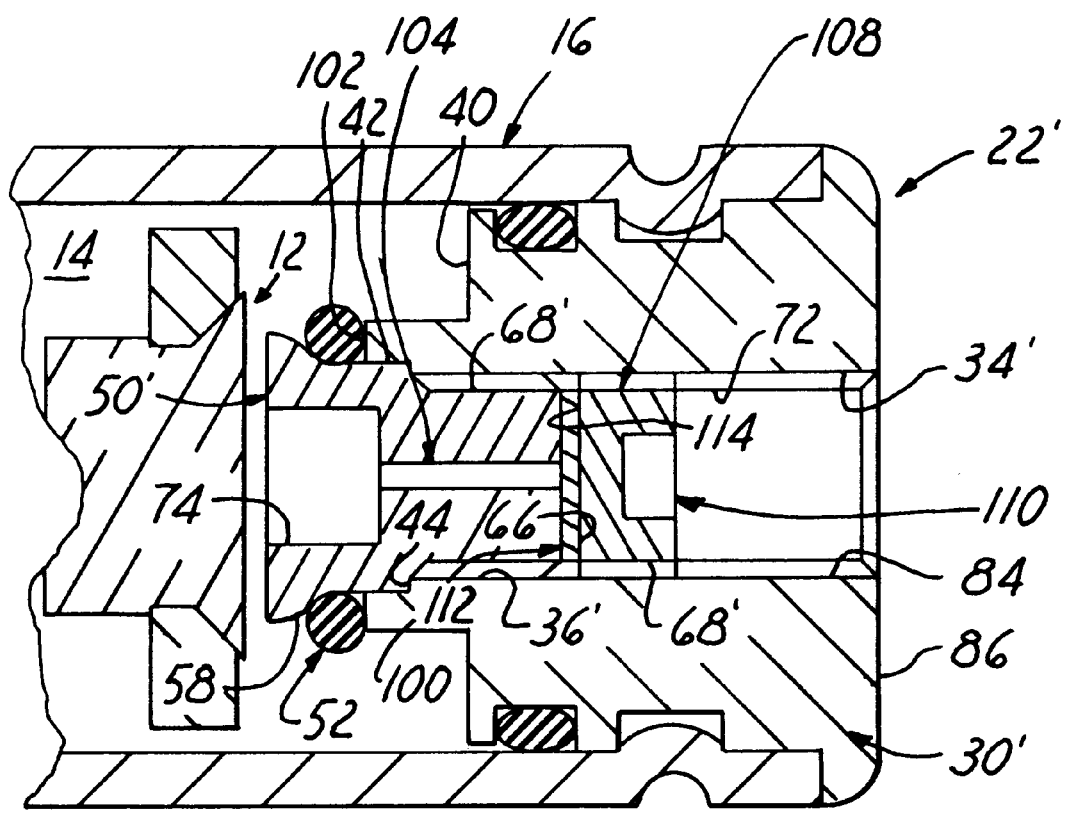
FIG. 6 is a fragmentary center sectional view of a second embodiment of a gas spring charging valve filler block construction of the invention.

Referring more particularly to the drawings, FIG. 1 illustrated a gas spring 10 comprising a piston and rod assembly 12 reciprocable in a gas chamber 14 of a casing 16, with a sealing assembly 18 at the front end of the casing through which a piston rod 20 sealably extends. The piston rod 20 is slidably received in a permanently lubricated bronze bearing 21 disposed in a steel retainer ring fixed by shoulders rolled into the casing. An improved filler block 22 of the present invention serves as an end cap closing the rear end of the casing. The casing is an elongated, open-ended tubular member with end portions 24 and 26 turned radially inwardly as shown. Except for filler block 22 embodying the improved charging valve construction of the invention, the remainder of gas spring 10 is of known construction and hence not described in detail.

Filler block 22 includes a generally cylindrical end cap 30 axially affixed and securely retained at the rear end of casing 16 by a shoulder rolled into the casing and rolled over end portion 26. Cap 30 has an external groove carrying an O-ring 32 for preventing escape of pressurized gas from chamber 14 between the cap and the casing 16. Cap 30 has a large diameter through-passageway defined successively by an internally threaded bore 34 opening at the rear face of the cap 30, an intermediate, internally threaded counterbore 36, and a slightly larger diameter concentric counterbore 38 opening at the inner, forward end face 40 of cap 30. Counterbore 38 has a smooth wall cylindrical surface 42 that terminates at the inner end of counterbore 38 with a radial face 44 (FIGS. 3 and 4) that defines a shoulder junction with counterbore 36.

In the first embodiment of FIGS. 1–5, the remaining components of filler block 22 consist simply of a screw-in valve head plug 50 and an O-ring 52. Screw plug 50 is a solid imperforate member manufactured as a body of revolution having a generally circular head 54 with a cylindrical outside diameter surface 56 greater in diameter by a predetermined amount than that of counterbore surface 42. Head 54 also has a frusto-conical O-ring sealing surface 58 formed with a forwardly divergent straight taper angle, preferably a 30° included angle relative to the center line axis C/L of plug 50. Surface 58 extends axially from max diameter surface 56 to a cylindrical shoulder surface 60 concentric with surfaces 56 and 58 and having a diameter slightly smaller by a predetermined amount than the diameter of surface 42. Cylindrical portion 60 has a right angle shoulder 62 defined by its junction with a shank portion 64 of plug 50 which in turn terminates at a radial rear end face 66. Shank 64 is provided with external machine screw straight threads 68 running from end face 66 toward shoulder portion 60 and terminating at a conical transition portion 70 which flares outwardly to meet shoulder 62 where its maximum diameter is slightly less than that of counterbore 36. Plug threads 68 are designed to threadably interengage internal machine screw straight threads 72 provided in counterbore 36 of cap 30 with a predetermined radial clearance between the peaks of external threads 68 and the roots of internal threads 72, and vice versa, preferably on the order of 0.003 inches (0.05 mm). Head 54 of screw plug 50 is also provided with a hexagonal blind socket 74 in its radial end face 76, as shown in FIG. 2.

O-ring 52 in its free state condition has an inside diameter slightly less than the diameter of cylindrical surface 60 so as to be snugly received in pre-assembly on this surface prior to installation of plug 50 into cap 30. To complete the subassembly of the filler block 22, prior to installation in casing 16, plug 50 with O-ring 52 so carried thereon is inserted shank end first into end counterbore 38 to start threads 68 into threads 72. Screw plug 50 is then rotated with a hex head driver tool (not shown) to thread plug 50 into its fully seated condition in cap 30, as shown in FIGS. 1 and 4 wherein shoulder 62 abuts shoulder 44. Plug 50 is preferably tightened down with a predetermined installation torque of 1–2 Lb.-In. max so that the trailing faces of external plug threads 68 bear lightly against the leading faces of the internal cap threads 72. The installed radial clearance between the peaks and roots threads 68 and 72 can be seen in FIG. 5 as well as in FIGS. 3 and 4.

Another, always-open gas leakage passageway is also provided between shoulder 62 and shoulder 44 when screw plug 50 has been so installed. Preferably to accomplish this shoulder 44 is notched, as by the end termination of thread 72 at shoulder 44 or by an additional notching operation. Alternatively, screw plug 50 may be backed off one-quarter to one-half turn after the aforementioned shoulder-to-shoulder initial seating to thereby slightly separate shoulder 62 from shoulder 44. Plug 50 is then held in this slightly backed-off position by the elastomeric spring biasing force developed in O-ring 52 during plug thread-in, as explained hereinafter.

During final threaded axial travel of screw plug 50 towards its fully seated condition, O-ring 52 will abut end face 40 of cap 30 to yieldably force the O-ring up the slope of conical surface 58, thereby circumferentially stretching O-ring 52 to develop an elastic force between an annular sealing zone 78 of O-ring 52 that tangentially contacts and squeezes against the surface 58, and between another annular gas sealing zone 80 of O-ring 52 that tangentially contacts and squeezes against cap end face 40, as shown in the fully installed sealed condition of FIG. 4. The extent of this "pre-compression" of O-ring 52 is thus controlled by cooperative dimensional geometry of O-ring with plug surfaces 62, 60 and 58 in further cooperation with the axial depth of shoulder surface 44 from end face 40 of cap 30. The filler block subassembly 22 is then installed into the rear end of casing 16 and affixed therein as shown in FIG. 1 by suitable roll curling and swaging operations.

To prepare the fully assembled gas spring 16 for operation and use with filler block 22 so incorporated therein, chamber 14 is first charged to a predetermined pressure with a suitable gas such as nitrogen. This is accomplish by using a conventional tank of gas containing nitrogen under high pressure typically equipped with a conventional pressure regulator and flexible supply hose. Typically the hose has a threaded end fitting (not shown) adapted to be threadably received into the internal threads 84 of cap bore 34, until the hose coupling O-ring (not shown) is suitable sealably engaged with the outer end face 86 of cap 30. The tank valve is then opened to admit gas into bore 34 under sufficient regulated pressure, typically ranging between 200 to 2,000 psi, depending upon the desired charge pressure intended for chamber 14 with the piston rod assembly 12 fully extended, i.e., at the maximum volume condition of chamber 14. Such charging pressures are sufficient to force the charging gas through the leakage clearance between the plug threads 68 and cap threads 72 so that the gas first flows along and around shank 64, as shown diagrammatically by the small arrows in FIG. 3, and thence between the engaged but unsealed shoulder surfaces 44 and 62, thence through the annular clearance space 88 between surface 60 and surface 42, and then enters the "valve chamber" space 90 initially held sealed by the aforementioned pre-compression of O-ring 52 (FIG. 4). The pressure of this charging gas then expands O-ring 52 by forcing it up the conical sealing surface 58, thereby opening an annular clearance port 92 between O-ring portion 80 and end face 40 of cap 30, as shown in FIG. 3, thereby allowing gas to enter chamber 14. After chamber 14 has been so charged with the pressurizing gas to the desired set pressure, the source is shut off The pressure of this gas in chamber 14 then presses O-ring 52 down into the fully seated and sealed condition of FIG. 4, thereby closing the chamber one-way entrance port 92 and sealing chamber 14.

Preferably O-ring 52 and screw plug head surfaces 58 and 60 and cap seat 44 are sized relative to one another so that, as shown in FIG. 4, when chamber 14 is so pressurized O-ring 52 does not bottom out on the cylindrical surface 60 of plug 50. The O.D. of head surface 56 is also made large enough to retain the gas pressure-opened O-ring 52 in the sealing groove defined between head surface 58 and cap surface 40 during rapid filling of chamber 14 with pressurized gas.

After the gas supply is shut off and O-ring has closed against surfaces 40 and 58, the feed line is then bled to atmosphere and disconnected from the gas spring. Gas spring 16 can then be utilized as a pre-charged and self-contained unit. This unit can be one-way re-charged as needed, and the pre-charge pressure can be set as desired within the constraints of the strength of materials and construction of the gas spring relative to the maximum working pressure to be encountered in use when the piston rod is fully displaced into the cylinder.

Second Embodiment

FIG. 6 illustrates a second embodiment filler block 22' of the invention installed and sealed in fixed relation in the rear end of casing 16. Filler block 22' is modified to provide for partial bleed-off adjustment of the gas pressure in chamber 14 or for emptying and recharging the gas spring to a predetermined desired pressure. Filler block 22' utilizes a slightly modified end cap 30' in which the central through passageway is axially lengthened by providing a cylindrical extension boss 100 protruding from the front end face 40 of the cap. Extension 100 is provided at its forward end with an annular radial surface 102 which functions in the manner of sealing face 40 of filler block 22. Extension 10 is also provided with the aforementioned counteibore 42 and shoulder 44 for threaded-stop seating of a modified screw-in plug 50'. Plug 50' may be made identical to plug 50 except that it is also provided with a central bleed passageway 104 extending axially between the rear end face 66 of plug 50' and the bottom face of the plug hex socket 74, and preferably of 0.030–0.050 of an inch in diameter. The central through-passageway of cap 30' is of constant rather than stepped diameter so that internal threads 72 are continuous for substantially the entire axial length of this passageway between shoulder 44 and cap end face 86. Again these threads are machine screw straight threads of constant pitch and constant peak and root dimensions.

In order to open and close bleed passageway 104, a flat-end bleed plug 108 is provided having external threads 68' engaging in passageway internal threads 72 in the same manner as the external threads 68 of screw plug 50'. Bleed plug 108 is provided with a hexagonal socket 110 for receiving a hexagonal male driving tool for rotatably threading the plug in cap bore 34'.

A suitable flat gasket seal 112 in the form of a flat disc having an O.D. slightly less than the I.D. of thread 72 is captured between the flat forward face 114 of plug 108 and the rear face 66 of plug 50' and compressed therebetween to seal the rear end of bleed passageway 104'. Thus in initial assembly of filler bock 22', plug 108 is threaded into place to force gasket seal 112 into sealing relationship with bleed passageway 104 so that pressurized gas cannot escape from chamber 14 via this bleed passageway. However, even with bleed plug 108 and gasket 112 so sealing screw plug 50', chamber 14 still can be charged by again coupling the hose fitting from the pressurized gas source threadably into the rear end of fill passageway 34' and admitting gas under pressure into the clearance space between the threads of plug 108 and the fitting and bore 34'. The pressurized gas will now first flow between the engaged external threads of bleed plug 108 and internal threads 72 of cap 30', and thence between external threads 68 of screw plug 50' and the engaged internal threads 72 of the cap fill passageway, and again will travel axially past the shoulder seat 44 even when engaged by plug 50' to thereby force O-ring 52 to its open condition as with the first embodiment as illustrated in FIG. 3. When chamber 14 has been charged to a desired pressure, the supply of pressurized gas is cut off, thereby enabling the internal pressurized gas from chamber 14 to force O-ring 52 into sealing relationship with surfaces 102' and of cap extension 100 and the frusto-conical surface 58 of plug 50' in the manner of the previous embodiment.

If and when it is desired to recharge chamber 14 to the initial set pressure, or to readjust the set pressure in this chamber, the second embodiment filler block 22' enables such adjustment by inserting a hex shank tool (not shown) into socket 110 of bleed plug 108 to rotate the plug in a loosening direction relative to gasket seal 112. When plug 108 is thus cracked off, pressurized gas in chamber 14 can bleed therefrom via bleed passageway 104 and then radially outwardly over the adjacent face of gasket seal 112, and then into clearance space between the threads of bleed plug 108 and passageway 34', and thence out the open passageway 34' to ambient. Typically the gas spring is allowed to so bleed until the pressure in chamber 14 is substantially at ambient pressure. Then plug 108 is retightened to seal the bleed passageway 104, and the recharging operation proceeds as described previously.

It is to be noted that O-ring 52 will remain compressed by the pressurized gas in chamber 14 through a small range of axial travel of screw plug 50' relative to end cap 30'. Hence, it cannot become unsealed and bleed off gas from chamber 14 even if bleed plug 108 is over tightened such that screw plug 50' is advanced slightly axially to the left to thereby slightly disengage shoulder 62 from shoulder 44.

Advantages

From the foregoing description and drawings, it will now be apparent to those skilled in the art that the improved filler block constructions of the invention, when incorporated into gas spring 10, amply fulfill the aforestated objects and provide many advantages over the prior art. Since screw plugs 50 and 50' are manufactured as a separate part from end caps 30 and 30' in the form of body of revolution as a threaded screw plug, they may be readily economically manufactured as a screw machine part or as a cold headed and threaded part. There is no need to drill the small diameter lateral port 122 of the aforementioned '906 end cap embodiment of FIGS. 6–8 as disclosed therein, thereby obviating the manufacturing problems associated with making this passageway as well as the operational problems of the O-ring in sealing this lateral passageway.

Since O-ring 52 uniformly seats throughout its 360° circumference against the sealing surfaces 58 and 40, 102 the potential gas escape passage to ambient between the screw plug and end cap is likewise a 360° annulus. Uniform sealing forces are therefore developed by the pressure differential of the gas in chamber 14 forcing O-ring 52 into the sealed relationship shown in FIGS. 4 and 6. This feature also overcomes the problem of extrusion of the elastomeric material of the O-ring at a pressure concentration point to thereby obviate failure of the O-ring seal in this mode. This feature also enables the use of a lower durometer O-ring material (e.g., a durometer of 70), which in turn improves sealing engagement between this softer more pliable O-ring and its associated seating surfaces over the full range of gas pressures, particularly at the lower end of the pressure range from 400 psi down to 200 psi. The capability of operation with a lower durometer O-ring material also enables the O-ring to better fill in imperfections, such as machining grooves, in the seating surfaces to thereby enhance reliability of the sealing action provided by the O-ring. Also, since there is no radial or lateral port drilled through the plug there are no burrs to remove.

Both the plug sealing surface 58 as well as the radial end face sealing surface 40 or 102' are easier to manufacture to the required tolerances because they are planar surfaces individually formed in the manufacture of the separate pieces. Because there is a separate manufacture of the screw plugs 50 and 50', it is also easier to machine the desired surface finish on the plug sealing surfaces 58, and likewise on the radial end face sealing surface 40, 102 of the cap of the filler block, thereby further contributing to retention of O-ring 52 on the separate threaded screw plug part. Additionally, the dimensionally controlled threaded engagement and shoulder stop seating with the end cap renders it easier to control the extent of precompression of O-ring 52, i.e., the axial dimension from shoulder seat 44 to the installed location of plug sealing surface 58.

As illustrated by comparing the exemplary first embodiment of FIGS. 1–5 versus the exemplary second embodiment of FIG. 6, the end cap charging valve construction of the filler blocks of the invention can be made for either no-chamber-bleed-off operation or chamber-bleed-off gas pressure adjustment of the gas springs. In either case, the one way filler check valve provided by the O-ring and screw plug is tamper proof once installed in the gas spring assembly.

By way of example and not by way of limitation, in one working prototype constructed in accordance with the foregoing description and drawings, the following parameters were utilized:

Root diameter of screw plug shank threads 68 and bleed plug threads 68 . . . M6: 4.92 mm: type of thread optional Peak diameter of threads 68 and 68' . . . 5.8 mm Root diameter of passageway threads 72 . . . 5.0 mm Peak diameter of passageway threads 72 . . . 5.9 mm Pitch of threads 68, 68' and 72 . . . 1.0 mm Thread type for threads 68, 68' and 72 . . . M6: type optional Overall axial length of threads:
  68 . . . 3.3 mm
  68' . . . 3.3 mm
  72 . . . 8.4 mm Axial dimension of surface 60 . . . 2.0 mm Axial dimension of surface 58 . . . 1.6 mm Axial depth of surface 44 . . . 1.39 mm O ring 52:
  Free state O.D . . . 7.8 mm
  Free state I.D . . . 6.8 mm
  Material . . . BUNA
  Durometer . . . 70A Material of screw plugs 50, 50' . . . SAE-1018

Material of end caps 30, 30' . . . UPER 1200

Working pressure range in chamber 14 . . . 2000–4500 psi

Taper angle of surface 58 . . . 30° from C/L

What is claimed is:

1. A filler block assembly for installation into the rear end of a gas spring casing for defining the rear sealing wall of the gas chamber of the gas spring, said filler block assembly comprising an end cap having a gas chamber filling passageway extending axially between axially opposed gas chamber facing front and exterior facing rear end faces of said cap and having internal threads at least adjacent the front end of said passageway, a screw plug having external threads threadably received in the front end of said cap passageway by threaded interengagement of said passageway and screw plug threads, said screw plug having an enlarged head portion protruding axially inwardly from said end cap front face and having an annular sealing surface defining with a sealing surface on said cap front face a pair of spaced annular sealing surfaces defining a wedge-like annular external groove divergent toward the surrounding gas chamber, and an O-ring encircling said screw plug and wedge-captured sealably between said pair of sealing surfaces, said screw plug and passageway threads being constructed and arranged to provide a gas filling leakage path therebetween such that said gas spring chamber can be charged with a pressurized gas admitted into the rear end of said filling passageway with said screw plug and O-ring installed in said cap in final operable position to function as a one-way check valve for admitting pressurized gas to the chamber of the gas spring and to prevent egress of the same therefrom through the seal provided by the O-ring, screw plug and end cap.

2. The filler block assembly of claim 1 wherein said screw plug has an external shoulder formed between said annular sealing surface on said plug and said external threads of said phlg, and said filling passageway of said cap passage has an internal shoulder axially inset from said annular sealing surface on said cap end face, said shoulders being constructed, arranged and dimensioned to defme the axial spacing between said pair of annular sealing surfaces for prestressing said O-ring in assembly by clamming said O-ring radially outwardly to stretch the same in the assembled condition of said screw plug in said end cap.

3. The filler block assembly of claim 1 wherein said screw plug is imperforate.

4. The filler block assembly of claim 1 wherein said screw plug has a bleed passageway extending axially therethrough communicating at one end with the gas spring chamber and at the other end with said filling passageway, said bleed passageway bypassing the O-ring seal, and further including a bleed plug threadably received in said cap filling passageway, and a sealing gasket captured between said bleed plug and said screw plug for sealing the adjacent end outlet of said screw plug bleed passageway, said gas filling leakage path including the clearance space between the threads of said bleed plug and said cap filling passageway.

5. The filler block assembly of claim 1 wherein said annular sealing surface on said end cap front face extends in a radial plane, and the annular sealing surface on said screw plug is generally conical and diverges away from said end cap radial sealing surface.

6. The filler block assembly set forth in claim 5 wherein said screw plug conical sealing surface has a taper angle of about 30° relative to the center line axis of said screw plug.

7. The filler block assembly of claim 1 in combination with a gas spring having said filler block assembly installed in the rear end of a casing of said gas spring and operable therein as set forth in claim 1.

8. The filler block assembly of claim 2 in combination with a gas spring having said filler block assembly installed in the rear end of a casing of said gas spring and operable therein as set forth in claim 1.

9. The filler block assembly of claim 3 in combination with a gas spring having said filler block assembly installed in the rear end of a casing of said gas spring and operable therein as set forth in claim 1.

10. The filler block assembly of claim 4 in combination with a gas spring having said filler block assembly installed in the rear end of a casing of said gas spring and operable therein as set forth in claim 1.

11. The filler block assembly of claim 5 in combination with a gas spring having said filler block assembly installed in the rear end of a casing of said gas spring and operable therein as set forth in claim 1.

12. The filler block assembly of claim 6 in combination with a gas spring having said filler block assembly installed in the rear end of a casing of said gas spring and operable therein as set forth in claim 1.

13. In a gas spring of the type having an elongated tubular casing having a chamber therein for containing gas under pressure and an annular wall defining an opening at one end of said chamber, a bearing in said chamber adjacent said one end of said casing and having a through bore for slidably receiving a rod, a piston in said chamber and upstream of said bearing and having said rod fixed thereto, said rod extending through said bearing for generally axial reciprocation therein and projecting from said chamber through said opening, said annular wall defining a second opening at the opposite end of said casing, an end cap fitted within said annular wall to close said second opening, said end cap having a fill passageway therein for charging said chamber with gas, a head projecting axially from said end cap into said chamber, a generally V-shaped groove of reduced cross-section relative to said head and disposed between the free end of said head and said end cap, said fill passageway opening to said chamber through said groove, and an O-ring encircling and received in said groove, said O-ring being subject to pressure of gas in said chamber to engage and close said groove and subject to the inflow of charging gas to open said groove, the improvement in combination therewith wherein said head and cap comprises a screw plug having external threads threadably received in said cap passageway by threaded interengagement of internal threads in said passageway and said screw plug threads, said screw plug having an enlarged head portion protruding axially into said chamber from said end cap and having an annular sealing surface defining with a sealing surface on said cap a pair of spaced annular sealing surfaces defining a wedge-like annular external groove divergent toward the surrounding gas chamber, said O-ring encircling said screw plug and wedge-captured sealably between said pair of sealing surfaces, said screw plug and passageway threads being constructed and arranged to provide a gas filling leakage path therebetween such that said gas spring chamber can be charged with a pressurized gas admitted into the exterior end of said cap filling passageway with said screw plug and O-ring installed in said cap in final operable position to function as a one-way check valve for admitting pressurized gas to the gas spring chamber and to prevent egress of the same therefrom through the seal provided by the O-ring, screw plug and end cap.

14. The combination of claim 13 wherein said screw plug has an external shoulder formed between said annular sealing surface on said screw plug and said plug external threads, and said fill passageway of said cap passage has an internal shoulder axially inset from said annular sealing surface on said cap end, said shoulders being constructed, arranged and dimensioned to defme the axial spacing between said pair of annular sealing surfaces for prestressing said O-ring in assembly by clamming said O-ring radially outwardly to stretch the same in the assembled condition of said screw plug in said end cap.

15. The combination of claim 13 wherein said screw plug is imperforate.

16. The combination of claim 13 wherein said screw plug has a bleed passageway extending axially therethrough communicating at one end with the gas spring chamber and at the other end with said cap fill passageway, said bleed passageway bypassing the O-ring seal and further including a bleed plug threadably received in said cap fill passageway, and a sealing gasket captured between said bleed plug and said screw plug for sealing the adjacent end outlet of said screw plug bleed passageway, said gas filling leakage path including the clearance space between the threads of said bleed plug and said cap filing passageway.

17. The combination of claim 13 wherein said annular sealing surface on said end cap extends in a radial plane, and said annular sealing surface on said screw plug is generally conical and diverges away from said end cap radial sealing surface.

18. The combination set forth in claim 17 wherein said screw plug conical sealing surface has a taper angle of about 30° relative to the center line axis of said screw plug.

19. The combination set forth in claim 17, and wherein said screw plug has an external shoulder formed between said annular sealing surface on said screw plug and said plug external threads and said fill passageway of said cap passage has an internal shoulder axially inset from said annular sealing surface on said cap end, said shoulders being constructed, arranged and dimensioned to define the axial spacing between said pair of annular sealing surfaces for prestressing said O-ring in assembly by clamming said O-ring radially outwardly to stretch the same in the assembled condition of said screw plug in said end cap.

20. The combination set forth in claim 17, and wherein said screw plug has a bleed passageway extending axially therethrough communicating at one end with the gas spring chamber and at the other end with said cap fill passageway, said bleed passageway bypassing the O-ring seal, and further including a bleed plug threadably received in said cap fill passageway and a sealing gasket captured between said bleed plug and said screw plug for sealing the adjacent end outlet of said screw plug bleed passageway, said gas filling leakage path including the clearance space between the threads of said bleed plug and said cap filing passageway.

* * * * *

UNITED STATES PATENT AND TRADEMARK OFFICE
CERTIFICATE OF CORRECTION

PATENT NO. : 5,975,507
DATED : November 2, 1999
INVENTOR(S) : Patrick J. Cotter

It is certified that error appears in the above-identified patent and that said Letters Patent is hereby corrected as shown below:

Col 10, Line 36, change "clamming" to -- camming --.

Col 10, Line 51, change "filing" to -- filling --.

Col 11, Line 1, change "clamming" to -- camming --.

Col 12, Line 6, change "filing" to -- filling --.

Signed and Sealed this

Twenty-seventh Day of June, 2000

Attest:

Q. TODD DICKINSON

Attesting Officer

Director of Patents and Trademarks